United States Patent
Hu

(10) Patent No.: US 12,267,382 B2
(45) Date of Patent: Apr. 1, 2025

(54) PROVIDING SERVICE SUPPORT EXTENSION DATA WITH POINT CLOUD FILE DATA

(71) Applicant: Tencent Technology (Shenzhen) Company Limited, Guangdong (CN)

(72) Inventor: Ying Hu, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 116 days.

(21) Appl. No.: 17/972,326

(22) Filed: Oct. 24, 2022

(65) Prior Publication Data

US 2023/0049384 A1 Feb. 16, 2023

Related U.S. Application Data

(63) Continuation of application No. PCT/CN2021/131225, filed on Nov. 17, 2021.

(30) Foreign Application Priority Data

Dec. 1, 2020 (CN) .......................... 202011392353.2

(51) Int. Cl.
*H04L 67/06* (2022.01)
*H04L 67/025* (2022.01)

(52) U.S. Cl.
CPC ............ *H04L 67/06* (2013.01); *H04L 67/025* (2013.01)

(58) Field of Classification Search
None
See application file for complete search history.

(56) References Cited

U.S. PATENT DOCUMENTS

2006/0095446 A1* 5/2006 Butler .................. G06F 16/81
2009/0027412 A1* 1/2009 Burley .................. G06T 15/04
345/582

(Continued)

FOREIGN PATENT DOCUMENTS

| CN | 103955966 A | 7/2014 |
| CN | 110045941 A | 7/2019 |
| CN | 110490977 A | 11/2019 |

OTHER PUBLICATIONS

Information technology—High efficiency coding and media delivery in heterogeneous environments—Part 1: MPEG media transport (MMT), ISO/IEC JTC 1/SC 29, ISO/IEC 23008-1:2017(E), Dec. 4, 2015, pp. 1-278.

(Continued)

*Primary Examiner* — Thu N Nguyen
(74) *Attorney, Agent, or Firm* — ArentFox Schiff LLP

(57) ABSTRACT

A point cloud file transmission method includes obtaining a point cloud file and extension information corresponding to the point cloud file, the point cloud file comprising point cloud data, the extension information providing information for a service. The service is implemented using the point cloud data. The method further includes indicating a correspondence between an item of the extension information and an item in the point cloud file by (i) the item in the point cloud file indicating an index of the item of the extension information or (ii) a file level location of the item of the extension information. The method further includes transmitting the point cloud file and the extension information to a receiving device, so that the receiving device performs the service using the point cloud data based on the extension information.

20 Claims, 7 Drawing Sheets

(56) References Cited

U.S. PATENT DOCUMENTS

| | | | |
|---|---|---|---|
| 2018/0315222 A1 | 11/2018 | Jones | |
| 2019/0069000 A1* | 2/2019 | Hou | H04N 21/2402 |
| 2019/0355173 A1* | 11/2019 | Gao | G06T 19/20 |
| 2022/0159261 A1* | 5/2022 | Oh | H04N 19/119 |

OTHER PUBLICATIONS

Information technology—Coding of audio-visual objects—Part 12: ISO base media file format, ISO/IEC JTC 1/SC 29 N, DIS 14496-12:202x(E), Sep. 2022.

International Search Report and Written Opinion issued in International Application No. PCT/CN2021/131225, mailed Feb. 14, 2022, with English Translation, 8 pages.

* cited by examiner

PROVIDING SERVICE SUPPORT EXTENSION DATA WITH POINT CLOUD FILE DATA

RELATED APPLICATIONS

This application is a continuation of International Application No. PCT/CN2021/131225, entitled "POINT CLOUD FILE TRANSMISSION METHOD AND APPARATUS, DEVICE, STORAGE MEDIUM, AND PROGRAM PRODUCT" and filed on Nov. 17, 2021, which claims priority to Chinese Patent Application No. 202011392353.2, entitled "POINT CLOUD FILE TRANSMISSION METHOD, APPLICATION METHOD, APPARATUS, DEVICE, AND STORAGE MEDIUM" and filed on Dec. 1, 2020. The entire disclosures of the prior applications are hereby incorporated by reference.

FIELD OF THE TECHNOLOGY

Embodiments of this application relate to the field of point cloud application technologies, including a point cloud file transmission method and apparatus, a device, a storage medium, and a program product.

BACKGROUND OF THE APPLICATION

With the continuous change in the manner for obtaining point clouds, the precision of obtaining point clouds is increasingly high, and correspondingly, costs for obtaining point clouds are gradually decreasing. Therefore, the application prospect of point clouds in various scenarios is increasingly wide.

In the related art, point cloud application services for individual users mainly involve application scenarios of point cloud data presentation. For example, a transmitting end device encodes the point cloud data and encapsulates encoded data streams to obtain a point cloud file, and transmits the point cloud file to a receiving end device. Correspondingly, the receiving end device first decapsulates and then decodes the point cloud file, and finally presents the decoded data streams.

SUMMARY

Embodiments of this disclosure provide a point cloud file transmission method and apparatus, a device, a storage medium, and a program product, which can expand application scenarios of services based on point cloud data. In an embodiment, a point cloud file transmission method includes obtaining a point cloud file and extension information corresponding to the point cloud file, the point cloud file comprising point cloud data, the extension information providing information for a service. The service is implemented using the point cloud data. The method further includes indicating a correspondence between an item of the extension information and an item in the point cloud file by (i) the item in the point cloud file indicating an index of the item of the extension information or (ii) a file level location of the item of the extension information. The method further includes transmitting the point cloud file and the extension information to a receiving device, so that the receiving device performs the service using the point cloud data based on the extension information.

In an embodiment, a point cloud file application method includes receiving a point cloud file and associated extension information, the point cloud file and the associated extension information having been obtained by a transmitting device by obtaining the point cloud file and extension information corresponding to the point cloud file and then associating the point cloud file and the extension information. The point cloud file includes point cloud data, and the extension information provides information for a service. The method further includes performing the service using the point cloud data based on the extension information. A correspondence between an item of the associated extension information and an item in the point cloud file is indicated by (i) the item in the point cloud file indicating an index of the item of the associated extension information or (ii) a file level location of the item of the associated extension information.

In an embodiment, a point cloud file transmission apparatus includes processing circuitry configured to obtain a point cloud file and extension information corresponding to the point cloud file, the point cloud file comprising point cloud data. The extension information provides information for a service, and the service is implemented using the point cloud data. The processing circuitry is further configured to indicate a correspondence between an item of the extension information and an item in the point cloud file by (i) the item in the point cloud file indicating an index of the item of the extension information or (ii) a file level location of the item of the extension information. The processing circuitry is further configured to associate the point cloud file with the extension information, and transmit the point cloud file and the extension information to a receiving device, so that the receiving device performs the service using the point cloud data based on the extension information.

The transmit end device (transmitting device) can transmit the associated point cloud file and extension information to the receive end device (receiving device). After receiving the associated point cloud file and extension information, the receive end device can implement the target service based on the point cloud data in the point cloud file according to the extension information. Because the extension information can carry information other than the point cloud data, the receive end device can be supported to implement the services that require information other than the point cloud data, thereby expanding application scenarios of services based on the point cloud data.

DESCRIPTION OF EMBODIMENTS

Before the embodiments of this disclosure are described, some terms involved in the embodiments of this disclosure are introduced first.

I. Point Cloud

The point cloud is a set of discrete points that are randomly distributed in space and express a spatial structure and a surface attribute of a three-dimensional (3D) object or scene. Each point in the point cloud has at least 3D location information, and may also have color, material, or other information according to different application scenarios. Generally, each point in the point cloud has the same quantity of additional attributes.

The point cloud may flexibly and conveniently express the spatial structure and the surface attribute of the 3D object or scene, and therefore is applied widely. Main application scenarios thereof may be classified into two types:

a) point clouds perceived by a machine, such as an autonomous navigation system, a real-time inspection system, a geographic information system, a visual sorting robot, and an emergency rescue robot; and b) point clouds perceived by human eyes, and point cloud application scenes such as digital cultural heritage, freeview broadcasting, 3D immersive communication, and 3D immersive interaction.

Methods for obtaining point cloud include, but are not limited to, computer generation, 3D laser scanning, 3D photogrammetry, and the like. The computer can generate point clouds of a virtual 3D object and scene. The 3D scanner can obtain point clouds of a static real-world 3D object or scene, and can obtain a million level of point clouds per second. The 3D camera can obtain point clouds of a dynamic real-world 3D object or scene, and can obtain a ten million level of point clouds per second. In addition, in the medical field, point clouds of biological tissues and organs can be obtained by magnetic resonance imaging (MRI), computed tomography (CT), and electromagnetic positioning information. These technologies reduce costs and time period for obtaining point cloud data and improve the data precision. The change of the manner for obtaining the point cloud data makes it possible to obtain a large amount of point cloud data. With the continuous accumulation of large-scale point cloud data, efficient storage, transmission, publishing, sharing and standardization of the point cloud data have become the key to point cloud applications.

The manners for encoding point clouds may be classified into video-based point cloud compression (V-PCC) and geometry-based point cloud compression (G-PCC).

Figure 1:
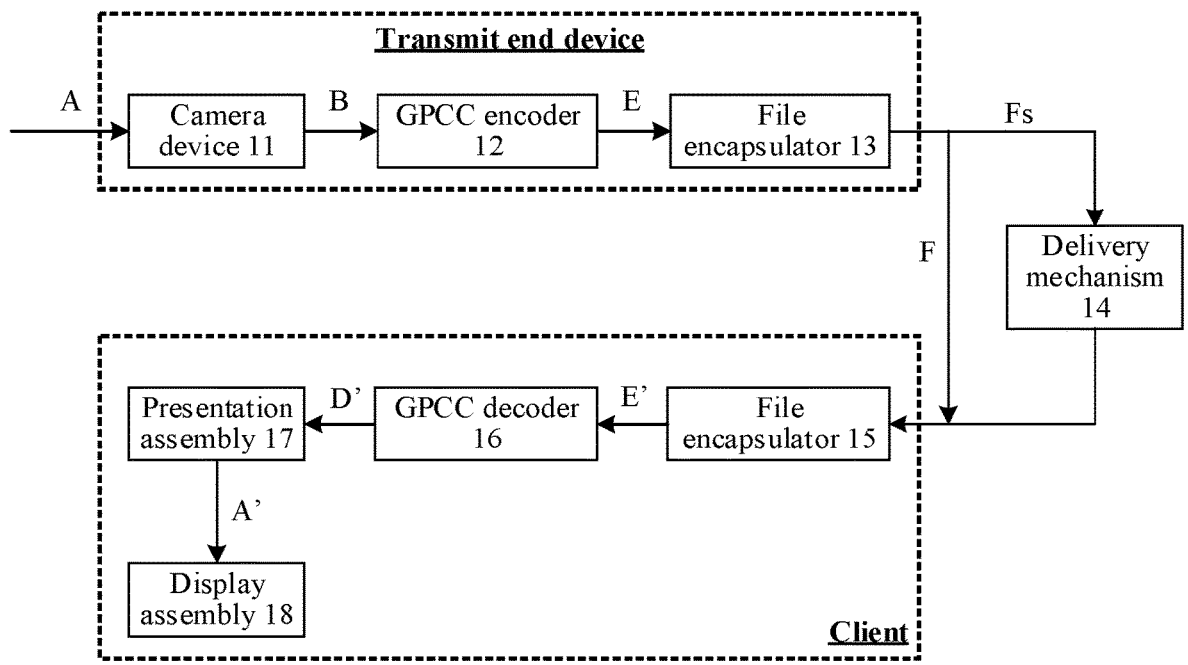
FIG. 1 is a block diagram of a point cloud application according to an embodiment of this disclosure.

FIG. 1 is a block diagram of a point cloud application according to an embodiment of this disclosure. Using G-PCC data as an example, in FIG. 1, on a transmit end, a real-world virtual scene (A) is captured by a set of cameras or a camera device 11 with a plurality of lenses and sensors. An acquisition result is source point cloud data (B). One or more point cloud frames are encoded by a G-PCC encoder 12 into encoded G-PCC bitstreams (E), which include encoded geometric bitstreams and attribute bitstreams. Then, a file encapsulator 13 encapsulates, according to a specified media container file format, the one or more encoded bitstreams (E) into a media file (F) for file playback, or into a sequence (Fs) of an initialization segment and a media segment for streaming transmission.

The file encapsulator 13 further includes metadata into the file or the segments, and (Fs) is delivered to a user side through a delivery mechanism 14. (Fs) is decapsulated by a file encapsulator 15 on the user side to obtain one or more encoded bitstreams (E') after decapsulation, then (E') are decoded by a G-PCC decoder 16 to obtain one or more decoded point cloud frames (D'), and a virtual scene (A') corresponding to the one or more point cloud frames (D') is presented on a display assembly 18 by a presentation assembly 17.

2. High Definition Map

The high definition map (HD Map) is a main application scenario of point clouds. The high definition map is a high resolution map format applied to the field of automatic driving.

In the current industry, common formats of the high definition map are as follows:

Navigation data standard (NDS) format, which is jointly developed by automotive manufacturers and suppliers to create an automotive grade navigation database standard format.

OpenDrive format, where OpenDrive is an open format specification for describing the logic of road networks. The objective is to standardize a logical road description to facilitate data exchange between different driving simulators.

The difference between the high definition map and a general navigation map can be shown in the following Table 1:

TABLE 1

| Type | General navigation map | High definition map |
|---|---|---|
| Use object | Human-driver | Machine-automatic driving system |
| Positioning precision | Meter-level | Centimeter-level |
| Real-time performance | Hour-level/Month-level update frequency | Minute-level, or even second-level update frequency |
| Included elements | Road-level data: road shape, gradient, direction, and the like Point of Information (POI): building | More detailed road model, including a lane model, a road component, and a road attribute |

TABLE 1-continued

| Type | General navigation map | High definition map |
|---|---|---|
| | size, quantity, purpose, and the like Administrative boundaries: national boundary and provincial boundary need to be expressed | A positioning layer and a dynamic layer specially used for an automatic driving system application |

According to effects in automatic driving, layers of the high definition map can be roughly divided into three layers: a lane-level road network layer, a positioning layer, and a dynamic layer.

1) The lane-level road network layer is used for navigation planning

A precise 3D representation (centimeter-level precision) of a road network is mainly described and stored as structured data, which can be classified into two types:

road data: such as geometric structures of roads, lane line type (solid line/dashed line or single line/double lines), lane line color (white or yellow) and data attribute (gradient, curvature, heading, or elevation) of each lane; and fixed object information around the lane: information such as traffic signs or traffic lights, lane height limit, sewer mouth, obstacles and other road details, as well as infrastructure information such as elevated objects, fence quantity, road edge types, and roadside landmarks.

2) The positioning layer is used for vehicle positioning

The elements included in the layer depend on which sensor an autonomous vehicle intends to use to match the positioning layer for positioning. However, there are great differences in positioning solutions for autonomous vehicles at present, such as a positioning solution based on visual feature matching, a positioning solution based on lidar point cloud feature matching, and a positioning solution based on data fusion of the visual feature and the lidar point cloud feature. Moreover, the elements included in the positioning layer are also related to an application scenario of the autonomous vehicle.

In the future, map vendors may generate different positioning layers of high definition maps according to different scenarios and sensors.

3) The dynamic layer is used for perceiving and considering route planning of current road and traffic conditions At the current stage, information elements required for the dynamic layer of the high definition map have not been determined, and still in the stage of discussion and research. However, the content included in the dynamic layer can be roughly classified into two aspects: real-time road conditions and traffic events, for example: dynamic traffic information such as road congestion, construction condition, whether a traffic accident occurs, traffic control condition, weather condition. Due to the daily changes in the road network, such as renovation, wear and repainting of a road sign line, changes of a traffic sign. These changes need to be reflected on the high definition map in time to ensure the driving safety of the autonomous vehicle.

Figure 2:
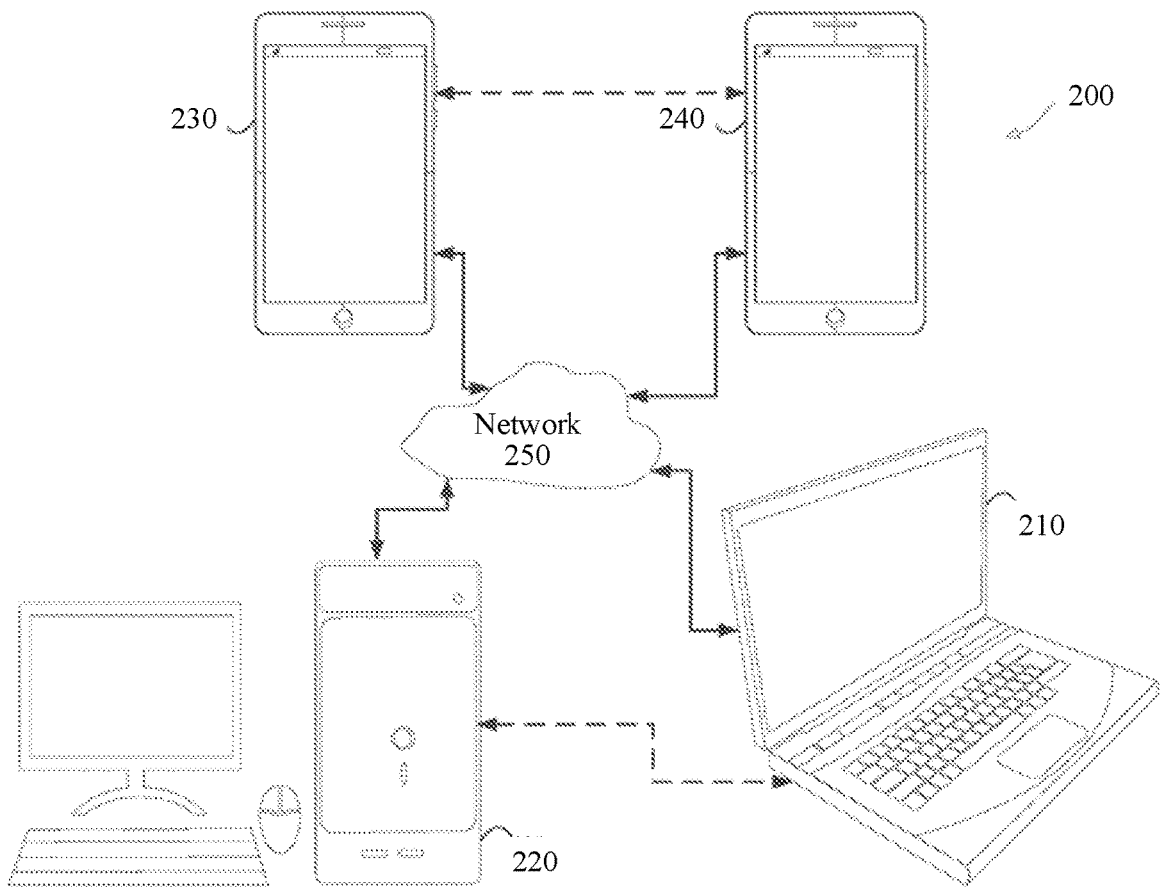
FIG. 2 is a simplified block diagram of a communication system according to an embodiment of this disclosure.

FIG. 2 is a simplified block diagram of a communication system according to an embodiment of this disclosure. The communication system 200 includes a plurality of devices, and the devices may communicate with each other through a network 250 for example. For example, the communication system 200 includes a first device 210 and a second device 220 that are connected to each other through the network 250. In the embodiment of FIG. 2, the first device 210 and the second device 220 perform unidirectional data transmission. For example, the first device 210 may encode and transmit point cloud data (such as point cloud frame streams acquired by the first device 210) to the second device 220 through the network 250. The encoded point cloud data is transmitted in the form of one or more encoded point cloud bitstreams. The second device 220 may receive the encoded point cloud data from the network 250, decode the encoded point cloud data to restore the point cloud data, and display the point clouds according to the restored point cloud data. The unidirectional data transmission is common in applications such as media services.

In another embodiment, the communication system 200 includes a third device 230 and a fourth device 240 that perform bidirectional transmission of the encoded point cloud data. For bidirectional data transmission, each of the third device 230 and the fourth device 240 may encode and transmit the point cloud data to the other of the third device 230 and the fourth device 240 through the network 250. Each of the third device 230 and the fourth device 240 may receive the encoded point cloud data transmitted by the other of the third device 230 and the fourth device 240, may decode the encoded point cloud data to restore the point cloud data, and may display the point clouds on an accessible display apparatus according to the restored point cloud data.

In the embodiment of FIG. 2, the first device 210, the second device 220, the third device 230, and the fourth device 240 may be computer devices such as servers, personal computers, and smartphones, but the principle disclosed in this disclosure is not limited thereto. The embodiments of this disclosure are applicable to a personal computer (PC), a mobile phone, a tablet computer, a virtual reality/augmented reality device, a media player, and/or a dedicated video conference device. The network 250 represents any quantity of networks that transmit the encoded point cloud data among the first device 210, the second device 220, the third device 230, and the fourth device 240, and includes, for example, a wired and/or wireless communication network. The communication network 250 may exchange data in circuit-switched and/or packet-switched channels. The network may include a telecommunication network, a local area network, a wide area network, and/or the Internet. For the purpose of this disclosure, unless explained below, the architecture and topology of the network 250 may be immaterial to the operations disclosed in this disclosure.

Figure 3:
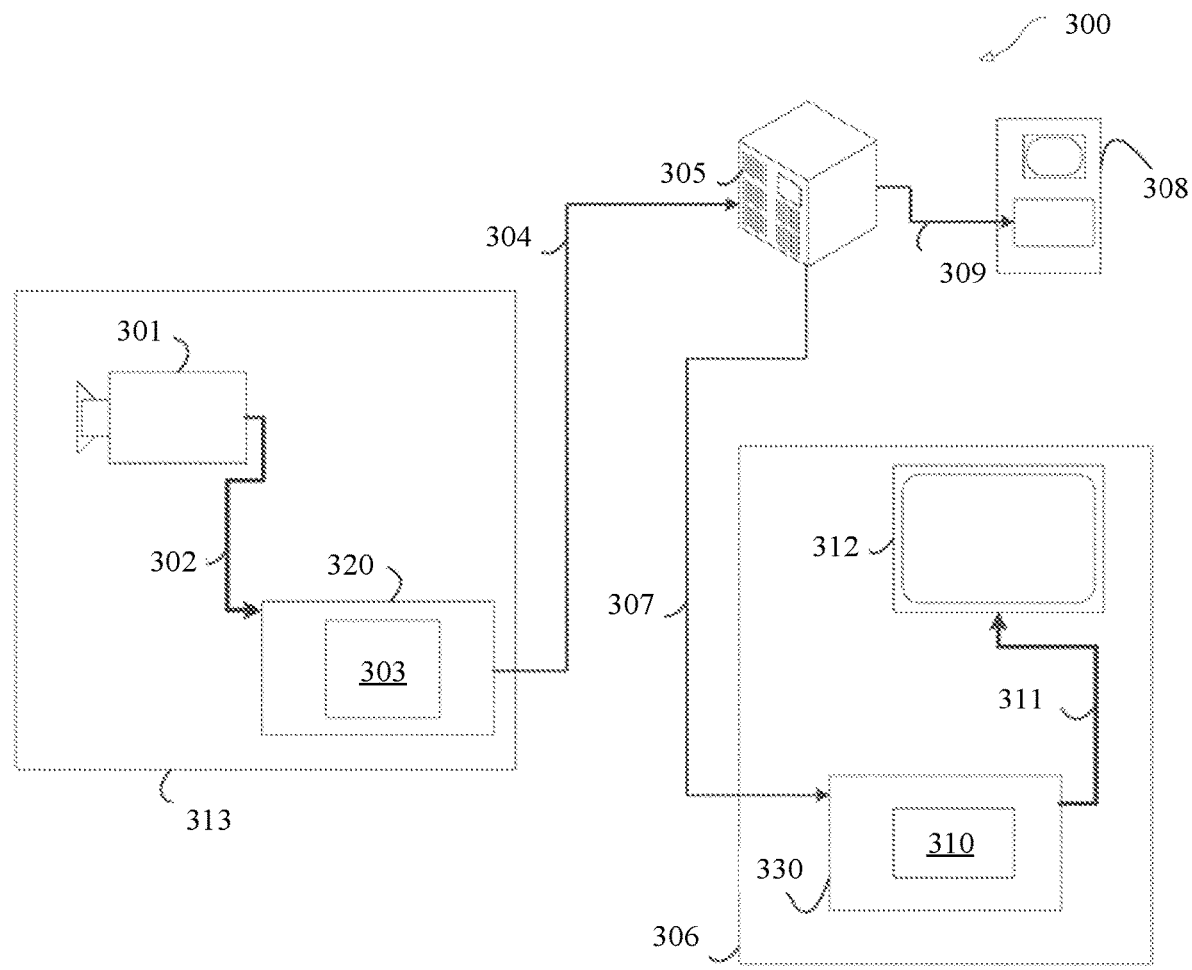
FIG. 3 is a schematic diagram of placement manners of a point cloud encoder and a point cloud decoder in a streaming transmission environment according to an embodiment of this disclosure.

As an embodiment, FIG. 3 shows placement manners of a point cloud encoder and a point cloud decoder in a streaming transmission environment. The subject disclosed in this disclosure is equally applicable to other point cloud-supported applications, including: a virtual 3D conference, a digital TV (television), and an application storing compressed point clouds on digital media such as a compact disc (CD), a digital versatile disc (DVD), and a memory stick.

A streaming transmission system may include an acquisition subsystem 313, the acquisition subsystem may include a point cloud source 301 such as a 3D camera, and the video source creates an uncompressed point cloud data stream 302. Compared to encoded point cloud data 304 (or encoded point cloud bitstreams), the point cloud data stream 302 is depicted as a thick line to emphasize a high data amount of the point cloud data stream. The point cloud data stream 302 may be processed by an electronic device 320, and the electronic device 320 includes a point cloud encoder 303 coupled to the point cloud source 301. The point cloud encoder 303 may include hardware, software, or a combination of hardware and software to implement or perform various aspects of the disclosed subject described in more detail below. Compared to the point cloud data stream 302, the encoded point cloud data 304 (or encoded point cloud bitstreams 304) is depicted as a thin line to emphasize a lower data amount of the encoded point cloud data 304 (or the encoded point cloud bitstreams 304), which may be stored on a streaming transmission server 305 for future use. One or more streaming transmission client subsystems, such as a client subsystem 306 and a client subsystem 308 in FIG. 3, may access the streaming transmission server 305 to retrieve a copy 307 and a copy 309 of the encoded point cloud data 304. The client subsystem 306 may include, for example, a point cloud decoder 310 in an electronic device 330. The point cloud decoder 310 decodes the incoming copy 307 of the encoded point cloud data and produces an output point cloud data stream 311 that can be represented on a display 312 (for example, a display screen) or another representation apparatus (not depicted). In some streaming transmission systems, the encoded point cloud data 304, point cloud data 307, and point cloud data 309 (for example, point cloud bitstreams) may be encoded according to some point cloud encoding/compression standards.

The electronic device 320 and the electronic device 330 may include other assemblies (not shown). For example, the electronic device 320 may include a point cloud decoder (not shown), and the electronic device 330 may further include a point cloud encoder (not shown). The point cloud decoder is configured to decode received encoded point cloud data. The point cloud encoder is configured to encode the point cloud data.

The technical solutions provided in the embodiments of this disclosure may be applied to an audio video coding standard (AVS) such as AVS3, or a standard supporting point cloud encoding such as a next-generation video encoding and decoding standard. This is not limited in the embodiments of this disclosure.

At present, point cloud services for individuals mainly involve services of point cloud presentation. That is, a transmit end device encodes and encapsulates the acquired or generated point cloud data to generate a point cloud file, and transmits the point cloud file to a receive end device. The receive end device extracts the point cloud data from the point cloud file and displays the point cloud data to a user. However, in current point cloud services, the presented point clouds are encapsulated and transmitted by the transmit end device, and cannot carry more information other than the point cloud data. As a result, the receive end device can only simply present the point cloud data, and cannot implement more diversified services based on the point cloud data, making it difficult to expand application scenarios of services based on the point cloud data.

Figure 4:
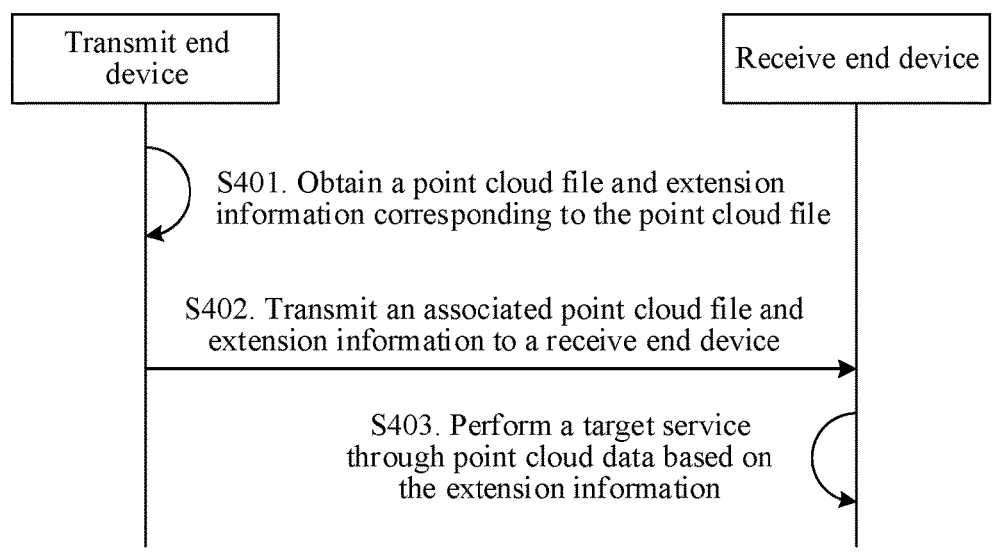
FIG. 4 is a flowchart of a point cloud file transmission and application method according to an embodiment of this disclosure.

In the solutions shown in the embodiments of this disclosure, a point cloud file transmission and application solution is provided. FIG. 4 is a flowchart of a point cloud file transmission and application method according to an embodiment of this disclosure. As shown in FIG. 4, a process of the point cloud file transmission and application method is as follows:

In the point cloud file transmission solution, a transmit end device obtains a point cloud file and extension information corresponding to the point cloud file (corresponding to step S401 in FIG. 4), the point cloud file being a file including point cloud data, the extension information being information providing support for a target service, and the target service being a service to be implemented through the point cloud data; and transmit the associated point cloud file and extension information to a receive end device (corresponding to step S402 in FIG. 4), so that the receive end device performs the target service through the point cloud data based on the extension information. The transmit end device may associate the point cloud file and the extension information before transmitting the associated point cloud file and extension information; In another possible implementation, the step of associating the point cloud file with the extension information may also be performed by a device other than the transmit end device. For example, a correspondence between an item of the extension information and an item in the point cloud file may be indicated by (i) the item in the point cloud file indicating an index of the item of the extension information or (ii) a file level location of the item of the extension information.

In the point cloud file application solution, a receive end device receives associated point cloud file and extension information that are transmitted by a transmit end device (corresponding to step S402 in FIG. 4); and performs the target service through point cloud data based on the extension information (corresponding to step S403 in FIG. 4). The receive end device may decode the associated point cloud file and extension information before performing the target service through the point cloud data; In another possible implementation, the step of decoding the associated point cloud file and extension information may also be performed by a device other than the receive end device.

In a possible implementation, the target service is a service to be performed based on the point cloud data in addition to presenting the point cloud data.

For example, the target service may be a positioning service, a navigation planning service, and an additional information presentation service other than the point cloud data in a high definition map scenario. Service forms of the target service are not limited in the embodiments of this disclosure.

According to the foregoing solution, the transmit end device of the point cloud file can associate the point cloud file with the extension information before transmitting the point cloud file, and transmit the associated point cloud file and extension information to the receive end device. After receiving the associated point cloud file and extension information, the receive end device can implement the target service based on the point cloud data in the point cloud file according to the extension information. Because the extension information can carry information other than the point cloud data, the receive end device can be supported to implement the services that require information other than the point cloud data, thereby expanding application scenarios of services based on the point cloud data.

The method provided in the embodiments of this disclosure may be implemented in a computer device based on a codec, where the codec has a function of encoding and decoding the point cloud data. That is, both the receive end device and the transmit end device may be a computer device, and the computer device refers to an electronic device such as a PC, a mobile phone, a tablet computer, a media player, a virtual reality/augmented reality device, or a server with data calculation, processing and storage capabilities.

In addition, the method provided in this disclosure may be used alone or in combination with other methods in any order.

The method provided in this disclosure may be applied to a server end, a player end, and an intermediate node of a point cloud media system.

For example, in a point cloud media encoding node (which may be a device with a point cloud media coding capability such as a server, a drone, or a mobile phone terminal), the extension information corresponding to the point cloud file is obtained according to the content of point cloud media and the application scenario of the point cloud media; In the point cloud media encoding node, when the point cloud media is encapsulated, the extension information of the point cloud media is associated with the point cloud file. This association can be achieved based on the association of file encapsulation itself, or based on a signaling file indication. The point cloud media is transmitted. In a point cloud media decoding node, extension information in the point cloud file can be flexibly used and presented according to application requirements.

In the solution provided in this disclosure, the transmit end device can associate the point cloud file and the extension information into the same file. For example, in the solution shown in this disclosure, several description fields can be added at a system layer, including a field extension at a file encapsulation layer to support the association of the point cloud file and the extension information.

Figure 5:
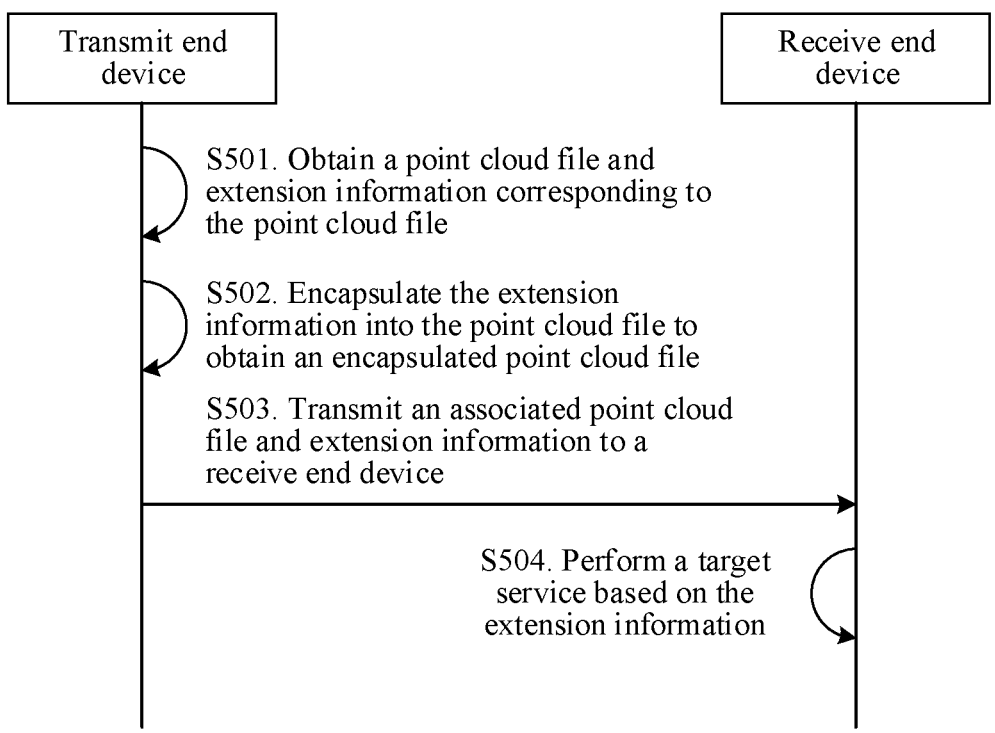
FIG. 5 is a flowchart of a point cloud file transmission and application method according to an embodiment of this disclosure.

FIG. 5 is a flowchart of a point cloud file transmission and application method according to an embodiment of this disclosure. For ease of description, the description is provided by merely using a computer device as the execution body of the steps. The method may include the following steps:

Step 501. A transmit end device obtains a point cloud file and extension information corresponding to the point cloud file, the point cloud file being a file including point cloud data, the extension information being information providing support for a target service, and the target service being a service to be implemented through the point cloud data.

In this embodiment of this disclosure, a point cloud media service provider can pre-create the point cloud file and enable the point cloud file to support the extension information required by the target service.

In a possible implementation, the extension information is used in combination with the point cloud data in the point cloud file to implement information of the target service other than the point cloud data presentation. For example, a correspondence between an item of the associated extension information and an item in the point cloud file may be indicated by (i) the item in the point cloud file indicating an index of the item of the associated extension information or (ii) a file level location of the item of the associated extension information.

For example, using the point cloud data being data of cultural relics exhibits in a digital museum as an example, the extension information may include detailed introduction information of the cultural relics, and the receive end device can present the detailed introduction information of the cultural relics while presenting the point cloud data.

In another example, using the point cloud data being high definition map data as an example, the extension information may include information that indicates navigation planning or positioning through the high definition map data, and the receive end device can display a navigation route or perform high definition positioning while presenting the point cloud data.

Information content of the extension information is determined by a service implementation requirement of the target service. The form and function of information included in the extension information are not limited in the embodiments of this disclosure.

Step 502. The transmit end device encapsulates the extension information into the point cloud file to obtain the encapsulated point cloud file as the associated point cloud file and extension information.

In this embodiment of this disclosure, the transmit end device encapsulates the extension information and the point cloud file together to generate a new point cloud file as an association result of the point cloud file and the extension information.

In a possible implementation, the encapsulating the extension information into the point cloud file includes:

encapsulating the extension information as an extension information item in the point cloud file based on a target item type.

Using the format of point cloud data being the international organization for standardization basic media file format (ISOBMFF) as an example, the transmit end device can define an extension information item of a new item type in the ISOBMFF data box of the point cloud data as the extension information item.

In an exemplary solution, the item is identified as "xitm".

In a possible implementation, the extension information is used for providing support for an application of first point cloud data in response to the extension information item being indexed by other items in the point cloud file, and the first point cloud data is a portion corresponding to the other items in the point cloud data; and the extension information is used for providing support for an application of second point cloud data in response to the extension information item not being indexed by other items in the point cloud file, and the second point cloud data is a portion corresponding to a file level where the extension information item is located in the point cloud data.

In this embodiment of this disclosure, the point cloud file may include a plurality of pieces of point cloud data, and the extension information may correspond to part of the point cloud data in the point cloud file, or may correspond to all point cloud data in the point cloud file.

For example, if the extension information item is indexed by an item in the point cloud file, a correspondence between the extension information and one or more pieces of the point cloud data in the point cloud file is indicated through an index relationship; and if the extension information item is not indexed by any item in the point cloud file, the correspondence between the extension information and one or more pieces of the point cloud data in the point cloud file is indicated through a file level where the extension information item is located.

In this embodiment of this disclosure, the extension information item may be linked to an item data box of another type through an item index data box of an "xirf" type, that is, indexed by the item data box of another type. If the extension information item is indexed by another item data box, extension information corresponding to the extension information item belongs to a data box that indexes the extension information item. If the extension information item is not indexed by another item data box, extension information corresponding to the extension information item belongs to the file level where the extension information item is located, that is, the extension information item describes a corresponding file level, movie level, track level, movie segment level, or track segment level.

In a possible implementation, the extension information includes application scenario information corresponding to the point cloud file.

Using the point cloud data being high definition map data as an example, in an exemplary solution of this embodiment of this disclosure, an item attribute data box corresponding to the extension information item is as follows:

```
aligned (8) class hd_map_info_struct ( ) {
  unsigned int (8) map_format;
  unsigned int (8) map_level;
}
aligned (8) class ExtensionItemProperty
extends ItemProperty ('ximp') {
  unsigned int (8) item_file_format;
  unsigned int (8) application_scenario;
    if (application_scenario == 0) {
    hd_map_info_struct ( );
  }
    string extension_info_description;
}
```

Semantics of the fields in the syntax definition are as follows:

item_file_format indicates a file format of the extension information item, and has values shown in the following Table 2:

TABLE 2

| Value of item_file_format | Meaning |
| --- | --- |
| 0 | Xml file |
| 1 | Binary file |
| Other | Reserved | application_scenario indicates an application scenario of item extension information, and has values shown in the following Table 3:

TABLE 3

| Value of application_scenario | Meaning |
| --- | --- |
| 0 | High definition map application |
| Other | Reserved | extension_info_description indicates description information of the extension information, and is a string that ends with an empty character.

map_format indicates a map format of the high definition map application, and has values shown in the following Table 4:

TABLE 4

| Value of map_format | Meaning |
| --- | --- |
| 0 | Open Drive map format |
| 1 | NDS map format |
| Other | Reserved | map_level indicates a map level of the high definition map, and has values shown in the following Table 5:

TABLE 5

| Value of map_level | Meaning |
| --- | --- |
| 0 | Lane-level road network layer |
| 1 | Positioning layer |
| 2 | Dynamic layer |
| Other | Reserved |

Step 503. The transmit end device transmits the associated point cloud file and extension information to a receive end device, and correspondingly, the receive end device receives the associated point cloud file and extension information.

In this embodiment of this disclosure, when transmitting the associated point cloud file and extension information, the transmit end device can transmit the encapsulated point cloud file to the receive end device.

Step 504. The receive end device performs a target service based on the extension information, the target service being a service to be implemented based on the point cloud data.

In this embodiment of this disclosure, the receive end device can decode the associated point cloud file and extension information, and perform the target service through the point cloud data in the point cloud file based on the extension information.

Figure 6:
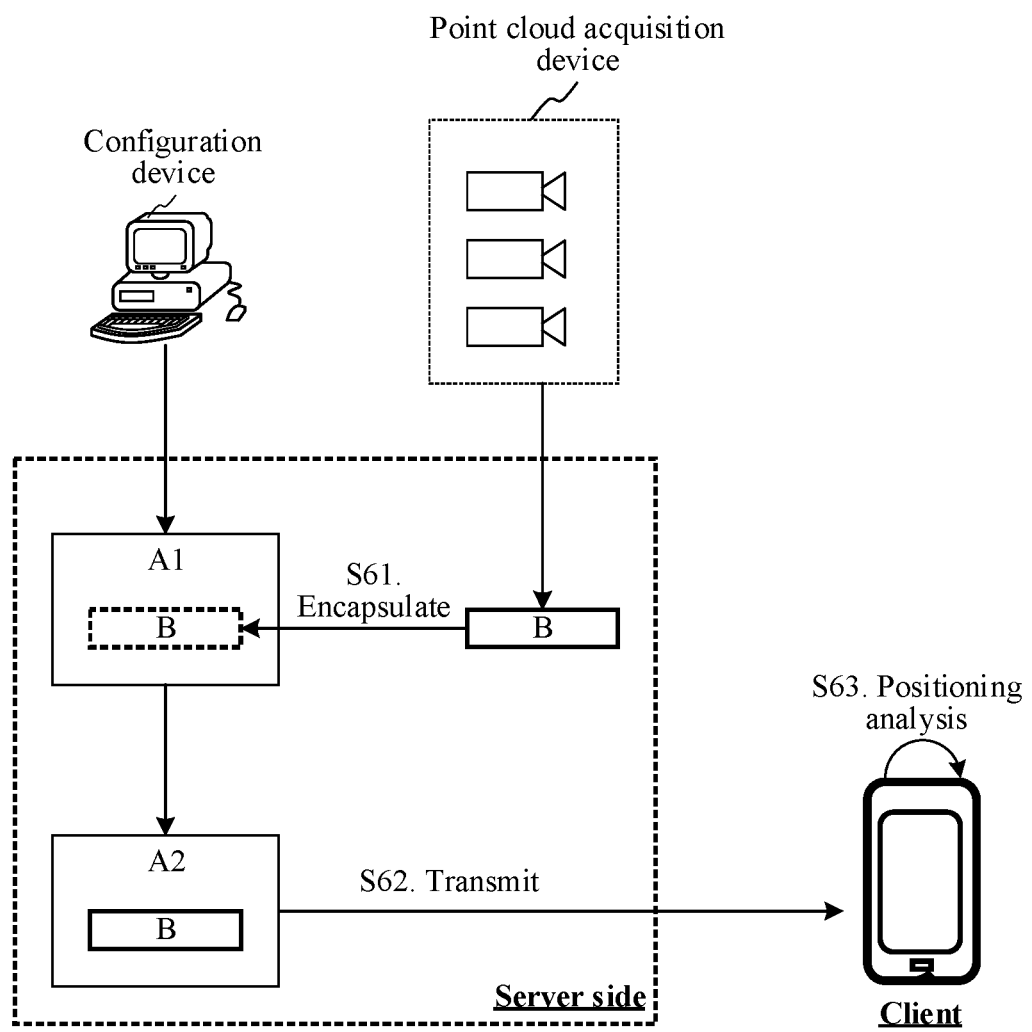
FIG. 6 is a schematic flowchart of positioning based on point cloud data involved in the embodiment shown in FIG. 5.

FIG. 6 is a schematic flowchart of positioning based on point cloud data according to an embodiment of this disclosure. As shown in FIG. 6, using the point cloud data being high definition map data and the target service being a positioning service as an example, it is assumed that a point cloud file A1 of high definition map data exists on a server side (transmit end device), and the high definition map is encapsulated as a point cloud media file in an item form. The high definition map data is point cloud data obtained through shooting/scanning an actual map scene by a point cloud acquisition device.

Moreover, corresponding map information (positioning layer information) is configured for the high definition map data by a service provider of the point cloud data through a configuration device, and stored in a server in an OpenDrive format. The file type is xml file recorded as file B.

At the server end, on the basis of the original point cloud file A1, the xml file B is also encapsulated into the file as an item (step S61) to obtain a new point cloud file A2.

In this case, there is an item of "xitm" type in the point cloud file A2, and the item is indexed to an item corresponding to the point cloud data of the high definition map through an index type of "xirf". Values of fields in the item attribute data box ExtensionItemProperty corresponding to the item are as follows:

item_file_format=0;
application_scenario=0;
map_format=0;
map_level=1;
extension_info_description='hd map info'.

The server end transmits the point cloud file A2 to the client (receive end device) (step S62).

At a point cloud media decoding client, the corresponding point cloud data can be indexed through map information during positioning, and the point cloud data is used for positioning analysis (step S63).

In the solution shown in FIG. 6, the map information is bound with the point cloud data as the extension information, and the map information is equivalent to guidance information. For example, if the map information indicates that there is a traffic light at the current position of the client, the point cloud data associated with the map information is the point cloud data including the traffic light. The client performs the positioning analysis through the point cloud data. For example, the client acquires local point cloud data in all directions, and matches the point cloud data associated with the map information in the point cloud file A2 with the local point cloud data to determine a relative position between the traffic light and the client, and further determines the current precise position of the client in combination with the position of the traffic light through the relative position.

In summary, in the solution shown in this embodiment of this disclosure, according to the foregoing solution, before transmitting the point cloud file, the transmit end device of the point cloud file first encapsulates the extension information into the point cloud file to associate the point cloud file and the extension information, and transmits the encapsulated point cloud file to the receive end device. After receiving the encapsulated point cloud file, the receive end device can implement the target service based on the point cloud data in the point cloud file according to the extension information. Because the extension information can carry information other than the point cloud data, the receive end device can be supported to implement the services that require information other than the point cloud data, thereby expanding application scenarios of services based on the point cloud data.

In the solution provided in this disclosure, the transmit end device can also establish an association relationship between the point cloud file and the extension information other than the point cloud file and the extension information. For example, in the solution shown in this disclosure, several description fields can be added at a system layer, including a field extension at a system signaling layer to support the association of the point cloud file and the extension information.

Figure 7:
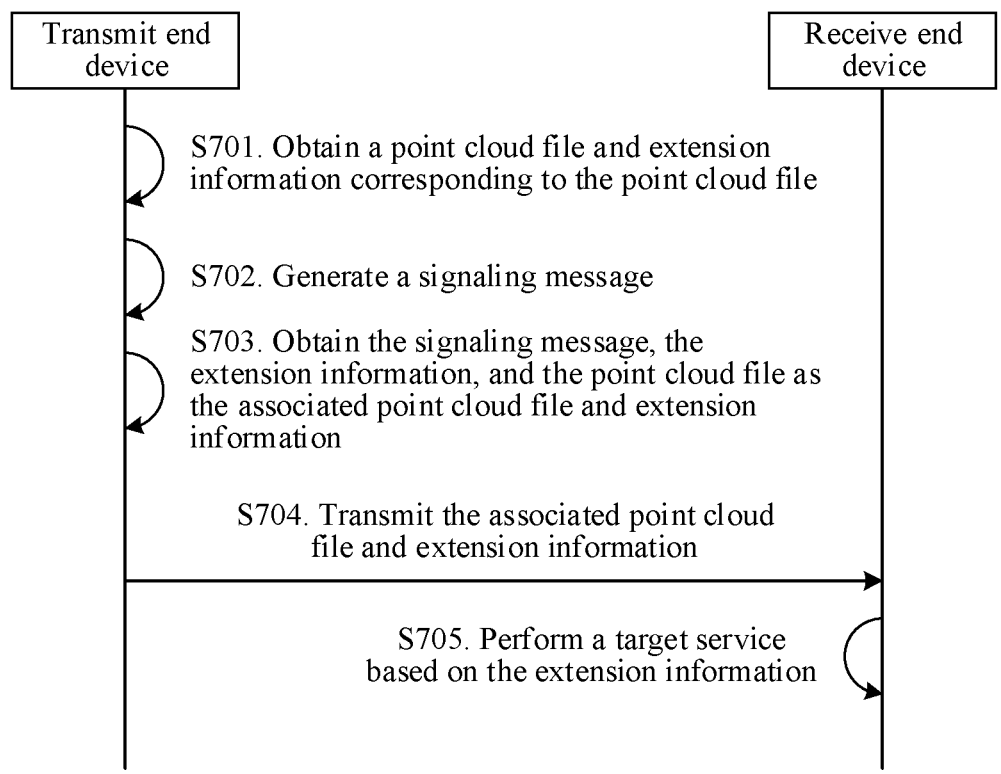
FIG. 7 is a flowchart of a point cloud file transmission and application method according to an embodiment of this disclosure.

FIG. 7 is a flowchart of a point cloud file transmission and application method according to an embodiment of this disclosure. For ease of description, the description is provided by merely using a computer device as the execution body of the steps. The method may include the following steps:

Step 701. A transmit end device obtains a point cloud file and extension information corresponding to the point cloud file, the point cloud file being a file including point cloud data, the extension information being information providing support for a target service, and the target service being a service to be implemented through the point cloud data.

For the above steps, reference may be made to the description of step 501 in the embodiment shown in FIG. 5 and details are not described herein again.

Step 702. The transmit end device generates a signaling message, where the signaling message is used for indicating an association relationship between the extension information and the point cloud file.

In a possible implementation, the signaling message includes an identifier of the point cloud file and an identifier of the extension information.

In a possible implementation, the extension information includes associated information; and the associated information is used for indicating a file level or an item associated with the extension information in the point cloud file.

In a possible implementation, the signaling message may be a signaling message based on moving picture experts group media transport (MMT).

The extension information shown in this embodiment of this disclosure, in addition to being indicated in the point cloud file encapsulation, the point cloud file can also be associated together with independent extension information by transmitting signaling (that is, the signaling message). After the receive end device requests the point cloud file, the extension information file and the corresponding signaling message, the signaling message can be parsed to obtain the association relationship between the point cloud file and the extension information file, thereby performing a corresponding strategy corresponding to the target service based on the point cloud data in the point cloud file according to the content in the extension information file.

A syntax structure of the signaling message may be shown in the following Table 6:

TABLE 6

| Syntax | Value | Bit number |
|---|---|---|
| Extension info indication message ( ) { | | |
|   message_id | | 16 |
|   version | | 8 |
|   length | N1 | 32 |
|   message_payload { | | |
|     table_count | N2 | 16 |
|     for(i=0;i<N2;i++){ | | |
|       Extension_info_table ( ) | | |
|     } | | |
|   } | | |
| } | | |

A syntax structure of the extension information may be shown in the following Table 7:

TABLE 7

| Syntax | Value | Bit number |
|---|---|---|
| Extension_info_table ( ) { | | |
|   table_id | | 8 |
|   version | | 8 |
|   length | N1 | 16 |
|   extension_file_format | | 8 |
|   extension_file_name_length | N2 | 8 |
|   for(i=0;i<N2;i++){ | | |
|     extension_file_name[i] | | 8 |
|   } | | |

TABLE 7-continued

| Syntax | Value | Bit number |
|---|---|---|
| extension_file_URL_length | N3 | 16 |
| for(i=0;i<N3;i++){ | | |
| URL_byte[i] | | 8 |
| } | | |
| applicationscenario | | 8 |
| if(application_scenario == 0){ | | |
| map_format | | |
| map_level | | |
| } | | |
| extension_info_description_length | N4 | 16 |
| for(i=0;i<N4;i++){ | | |
| extension_info_description [i] | | 8 |
| } | | |
| associated_asset_id( ) | | |
| associated_track_flag | | 1 |
| associated_item_flag | | 1 |
| reserved | | 6 |
| if(associated_track_flag){ | | |
| associated_track_id | | 32 |
| } | | |
| if(associated_item_flag){ | | |
| _associated_item_id | | 16 |
| } | | |
| } | | |

In the foregoing Table 6 and Table 7, semantics of the fields are as follows:

extension_file_format indicates a file format of the extension information;

extension_file_name_length and extension_file_name respectively indicate a file name length and a specific file name of the extension information, where the file name length does not include the last terminator of a string;

extension_file_URL_length and URL_byte respectively indicate a URL address length and specific address information of the extension information file.

application_scenario indicates an application scenario of the extension information;

extension_info_description_length and extension_info_description respectively indicate a description field length and detailed description information of the extension information, where the description field length does not include the last terminator of a string;

map_format indicates a map format of the high definition map application;

map_level indicates a map level of the high definition map;

associated_asset_id indicates asset_id of the media file associated with the extension information, where asset_id is a file identifier defined by MMT standard;

associated_track_flag and associated_item_flag indicate whether the extension information is associated with the track level and a specific item, and values of the two flags are independent of each other;

associated_track_id indicates an associated track id;

associated_item_id indicates an associated item id.

Step 703. The transmit end device obtains the signaling message, the extension information, and the point cloud file as the associated point cloud file and extension information.

In this embodiment of this disclosure, the transmit end device uses the generated signaling message, the extension information and the point cloud file together as the associated point cloud file and extension information, and indicates an association relationship between the extension information and the point cloud file to the receive end device through the signaling message.

Step 704. The transmit end device transmits the associated point cloud file and extension information to the receive end device, and correspondingly, the receive end device receives the associated point cloud file and extension information.

In a possible implementation, the transmitting the associated point cloud file and extension information to the receive end device includes:

transmitting the signaling message to the receive end device, where the signaling message is used for indicating the receive end device to pull the point cloud file and the extension information.

In this embodiment of this disclosure, when transmitting the associated point cloud file and extension information to the receive end device, the transmit end device can first transmit the signaling message to the receive end device. After receiving the signaling message, the receive end device requests the point cloud file and the extension information from the transmit end device based on the association relationship in the signaling message.

In a possible implementation, the signaling message further includes at least one of a service identifier of the target service or an information type identifier of the extension information.

In this embodiment of this disclosure, since the point cloud file and the extension information are associated through the signaling message, the transmission can be independent. Therefore, the receive end device can decide whether to receive the extension information associated with the point cloud file according to the usage.

The receive end device can decide whether to receive the extension information through at least one of the service identifier carried in the signaling message or the information type identifier of the extension information.

For example, in the high definition map scenario, the point cloud data of the high definition map can be used for a plurality of services, and the receive end device can set to start/end the services; For example, the point cloud data of the high definition map can be used for a positioning service and a traffic light reminding service. Assuming that the receive end device currently starts the positioning service, but ends the traffic light reminding service, after receiving the signaling message, if the service identifier carried in the signaling message indicates the positioning service, or, the information type identifier carried in the signaling message indicates that the extension information is information required by the positioning service, the receive end device may request and receive the extension information from the transmit end device; otherwise, the receive end device may not request the extension information from the transmit end device, thereby avoiding unnecessary transmission of the extension information and saving system resources.

Step 705. The receive end device performs a target service based on the extension information, the target service being a service to be implemented based on the point cloud data.

For example, the receive end device performs the target service through the point cloud data in the point cloud file based on the extension information.

Figure 8:
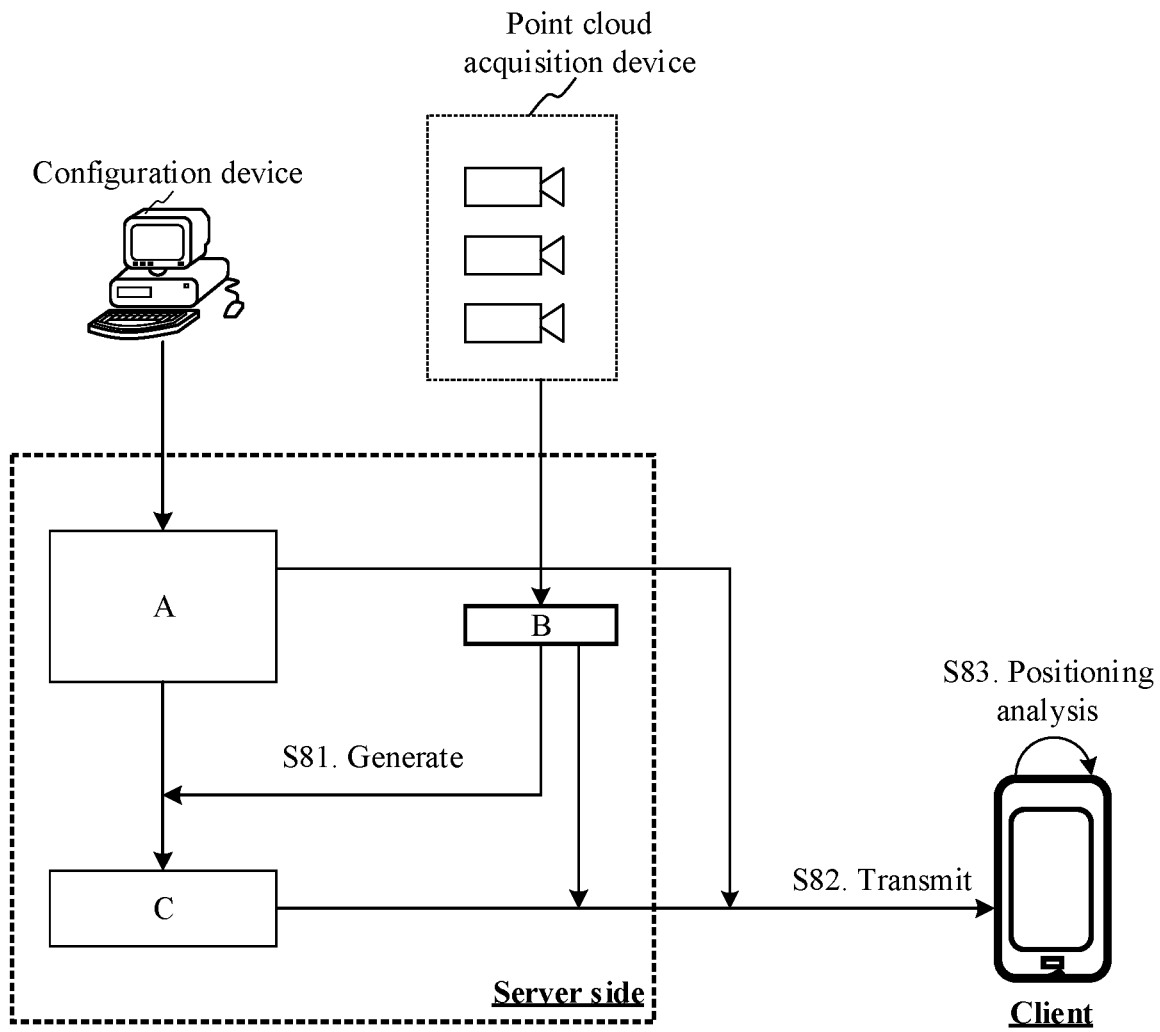
FIG. 8 is a schematic flowchart of positioning based on point cloud data involved in the embodiment shown in FIG. 7.

FIG. 8 is a schematic flowchart of positioning based on point cloud data according to an embodiment of this disclosure. As shown in FIG. 8, using the point cloud data being high definition map data and the target service being a positioning service as an example, it is assumed that a point cloud file A of high definition map data exists on a server side (transmit end device), and the high definition map is encapsulated as a point cloud media file in an item form. The high definition map data is point cloud data obtained through shooting/scanning an actual map scene by a point cloud acquisition device.

Moreover, corresponding map information (positioning layer information) is configured for the high definition map data by a service provider of the point cloud data through a configuration device, and stored in a server in an OpenDrive format. The file type is xml file recorded as file B.

At the server end, a signaling message C is generated based on the point cloud file A and the xml file B (step S81), that is, the association relationship between the original point cloud file A and the xml file B is indicated by indication signaling of the extension information as follows:

```
Extension_info_indication_message:
table_count=1;
Extension_info_table:
extension_file_format = 0;
extension_file_name_length= 1;
extension_file_name='B';
extension_file_URL_length = 4;
URL='xl23';
application_scenario=0;
map_format = 0;
map_level=1;
extension_info_description_length=11;
extension_info_description='hd map info';
associated_asset_id='asset_id_pcc';
associated_track_flag=true;
as sociated_item_fl ag=true;
associated_track_id=10;
associated_item_id=101.
```

The server end transmits the point cloud file A, the xml file B, and the signaling message C to the client (receive end device) (step S82).

At a point cloud media decoding client, the signaling message C is parsed, so that the corresponding point cloud data can be indexed through map information during positioning, and the point cloud data is used for positioning analysis (step S83).

In summary, in the solution shown in this embodiment of this disclosure, according to the foregoing solution, before transmitting the point cloud file, the transmit end device of the point cloud file first generates an associated file (that is, a signaling message) between the point cloud file and the extension information to associate the point cloud file and the extension information, and transmits the point cloud file, the extension information, and the associated file to the receive end device. The receive end device can parse the associated file to implement the target service based on the point cloud data in the point cloud file according to the extension information. Because the extension information can carry information other than the point cloud data, the receive end device can be supported to implement the services that require information other than the point cloud data, thereby expanding application scenarios of services based on the point cloud data.

The following are apparatus embodiments of this disclosure, which can be used to perform the method embodiments of this disclosure. For details not disclosed in the apparatus embodiments of this disclosure, refer to the method embodiments of this disclosure.

Figure 9:
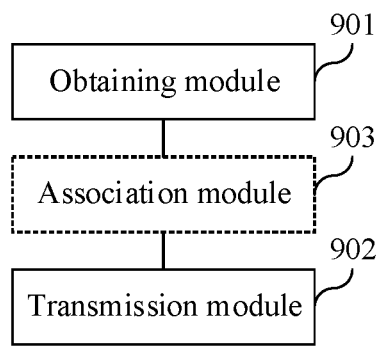
FIG. 9 is a block diagram of a point cloud file transmission apparatus according to an embodiment of this disclosure.

FIG. 9 is a block diagram of a point cloud file transmission apparatus according to an embodiment of this disclosure. The apparatus has functions of implementing the above method examples, and the functions may be implemented by hardware executing corresponding software. The apparatus may include:

an obtaining module 901, configured to obtain a point cloud file and extension information corresponding to the point cloud file, the point cloud file being a file including point cloud data, the extension information being information providing support for a target service, and the target service being a service to be implemented through the point cloud data; and a transmission module 902, configured to transmit the associated point cloud file and extension information to a receive end device, so that the receive end device performs the target service through the point cloud data based on the extension information.

In a possible implementation, the apparatus further includes: an association module 903, configured to associate the point cloud file with the extension information before the transmission module transmits the associated point cloud file and extension information to the receive end device.

In a possible implementation, the association module 903 is configured to encapsulate the extension information into the point cloud file to obtain the encapsulated point cloud file as the associated point cloud file and extension information.

In a possible implementation, the association module 903 is configured to encapsulate the extension information as an extension information item in the point cloud file based on a target item type to obtain the encapsulated point cloud file.

In a possible implementation, the extension information is used for providing support for an application of first point cloud data in response to the extension information item being indexed by other items in the point cloud file, and the first point cloud data is a portion corresponding to the other items in the point cloud data; and the extension information is used for providing support for an application of second point cloud data in response to the extension information item not being indexed by other items in the point cloud file, and the second point cloud data is a portion corresponding to a file level where the extension information item is located in the point cloud data.

In a possible implementation, the association module 903 is configured to:

generate a signaling message, where the signaling message is used for indicating an association relationship between the extension information and the point cloud file; and obtain the signaling message, the extension information, and the point cloud file as the associated point cloud file and extension information.

In a possible implementation, the signaling message includes an identifier of the point cloud file and an identifier of the extension information.

In a possible implementation, the signaling message further includes at least one of a service identifier of the target service or an information type identifier of the extension information.

In a possible implementation, the extension information includes associated information; and the associated information is used for indicating a file level or an item associated with the extension information in the point cloud file.

In a possible implementation, the transmission module 902 is configured to transmit the signaling message to the receive end device, where the signaling message is used for indicating the receive end device to pull the point cloud file and the extension information.

In a possible implementation, the extension information includes application scenario information corresponding to the point cloud file.

In summary, according to the foregoing solution, the transmit end device of the point cloud file can transmit the associated point cloud file and extension information to the receive end device. After receiving the associated point cloud file and extension information, the receive end device can implement the target service based on the point cloud data in the point cloud file according to the extension information. Because the extension information can carry information other than the point cloud data, the services that require information other than the point cloud data can be implemented, thereby expanding application scenarios of services based on the point cloud data.

Figure 10:
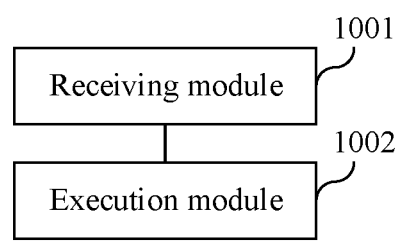
FIG. 10 is a block diagram of a point cloud file application apparatus according to an embodiment of this disclosure.

FIG. 10 is a block diagram of a point cloud file application apparatus according to an embodiment of this disclosure. The apparatus has functions of implementing the above method examples, and the functions may be implemented by hardware executing corresponding software. The apparatus may include:

a receiving module 1001, configured to receive associated point cloud file and extension information, the associated point cloud file and extension information being obtained by a transmit end device by obtaining the point cloud file and the extension information corresponding to the point cloud file and then associating the point cloud file and the extension information; and the point cloud file being a file including point cloud data; and an execution module 1002, configured to perform a target service based on the extension information, the target service being a service to be implemented based on the point cloud data.

In a possible implementation, the apparatus further includes: a decoding module, configured to decode the associated point cloud file and extension information before the execution module performs the target service through the point cloud data based on the extension information.

In a possible implementation, the receiving module 1001 is configured to receive the encapsulated point cloud file; and the extension information is encapsulated in the encapsulated point cloud file.

In a possible implementation, the extension information is an extension information item in the encapsulated point cloud file.

In a possible implementation, the extension information is used for providing support for an application of first point cloud data in response to the extension information item being indexed by other items in the point cloud file, and the first point cloud data is a portion corresponding to the other items in the point cloud data; and the extension information is used for providing support for an application of second point cloud data in response to the extension information item not being indexed by other items in the point cloud file, and the second point cloud data is a portion corresponding to a file level where the extension information item is located in the point cloud data.

In a possible implementation, the receiving module 1001 is configured to:

receive a signaling message, where the signaling message includes an identifier of the point cloud file and an identifier of the extension information; and pull the point cloud file and the extension information according to the signaling message.

In a possible implementation, the signaling message further includes at least one of a service identifier of the target service or an information type identifier of the extension information.

In a possible implementation, the extension information includes associated information; and the associated information is used for indicating a file level or an item associated with the extension information in the point cloud file.

In a possible implementation, the extension information includes application scenario information corresponding to the point cloud file.

In summary, according to the foregoing solution, after receiving the associated point cloud file and extension information, the receive end device can implement the target service based on the point cloud data in the point cloud file according to the extension information. Because the extension information can carry information other than the point cloud data, the services that require information other than the point cloud data can be implemented, thereby expanding application scenarios of services based on the point cloud data.

Figure 11:
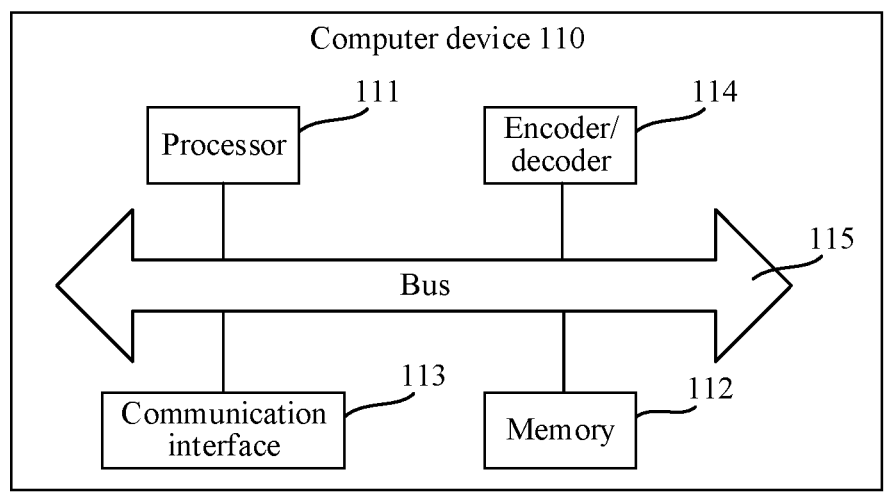
FIG. 11 is a structural block diagram of a computer device according to an embodiment of this disclosure.

FIG. 11 is a schematic block diagram of a computer device according to an embodiment of this disclosure. The computer device may be the transmit end device described above, or may be the receive end device described above. The computer device 110 may include a processor 111 (including processing circuitry), a memory 112 (a non-transitory computer-readable storage medium), a communication interface 113, an encoder/decoder 114, and a bus 115.

The processor 111 includes one or more processing cores, and the processor 111 performs various functional applications and information processing by running software programs and modules.

The memory 112 may be configured to store a computer program, and the processor 111 is configured to perform the computer program to implement all or some of the steps of the method involved in the embodiment shown in FIG. 5 or FIG. 7.

The communication interface 113 may be configured to communicate with other devices, for example, receive and transmit point cloud data.

The encoder/decoder 114 may be configured to implement encoding and decoding functions, for example, encode and decode point cloud data.

The memory 112 is connected to the processor 111 through the bus 115.

In addition, the memory 112 may be implemented by any type of volatile or non-volatile storage device, or a combination thereof.

A person skilled in the art may understand that the structure shown in FIG. 11 does not constitute any limitation on the computer device 110, and the computer device may comprise more components or fewer components than those shown in the figure, or some components may be combined, or a different component deployment may be used.

In an exemplary embodiment, a computer-readable storage medium is further provided, storing at least one computer program, the at least one computer program being executed by a processor to implement all or some of the steps of the method involved in the embodiment shown in FIG. 5 or FIG. 7.

In an embodiment, a non-transitory computer-readable storage medium stores computer-readable instructions which, when executed by a computer device, cause the computer device to perform a point cloud file transmission method. The point cloud file transmission method includes obtaining a point cloud file and extension information corresponding to the point cloud file, the point cloud file comprising point cloud data, the extension information providing information for a service. The service is implemented using the point cloud data. The method further includes indicating a correspondence between an item of the extension information and an item in the point cloud file by (i) the item in the point cloud file indicating an index of the item of the extension information or (ii) a file level location of the item of the extension information. The method further includes transmitting the point cloud file and the extension information to a receiving device, so that the receiving device performs the service using the point cloud data based on the extension information.

In an embodiment, a non-transitory computer-readable storage medium stores computer-readable instructions which, when executed by a computer device, cause the computer device to perform a point cloud file application method. The point cloud file application method includes receiving a point cloud file and associated extension information, the point cloud file and the associated extension information having been obtained by a transmitting device by obtaining the point cloud file and extension information corresponding to the point cloud file and then associating the point cloud file and the extension information. The point cloud file includes point cloud data, and the extension information provides information for a service. The method further includes performing the service using the point cloud data based on the extension information. A correspondence between an item of the associated extension information and an item in the point cloud file is indicated by (i) the item in the point cloud file indicating an index of the item of the associated extension information or (ii) a file level location of the item of the associated extension information.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A point cloud file transmission method, comprising:
obtaining a point cloud file and extension information corresponding to the point cloud file, the point cloud file comprising point cloud data, the extension information providing information for a service comprising one of a navigation planning service or a high definition map service using the point cloud data;
indicating a correspondence between an item of the extension information and an item in the point cloud file by (i) the item in the point cloud file indicating an index of the item of the extension information and (ii) when the item of the extension information is not indexed by any item in the point cloud file, the correspondence is indicated by a file level location of the item of the extension information; and
transmitting the point cloud file and the extension information to a receiving device, so that the receiving device performs the service using the point cloud data based on the extension information.

2. The method according to claim 1, further comprising:
associating the point cloud file with the extension information, wherein when the item of the extension information is not indexed by any item in the point cloud file by a data item box, the correspondence is indicated by and associated with the file level location of the item of the extension information.

3. The method according to claim 2, wherein the associating comprises:
encapsulating the extension information into the point cloud file to obtain an encapsulated point cloud file as the associated point cloud file and extension information.

4. The method according to claim 3, wherein the encapsulating comprises:
encapsulating the item of the extension information in the point cloud file using a corresponding item type to obtain the encapsulated point cloud file.

5. The method according to claim 4, wherein
the extension information is used for providing support for an application of first point cloud data in response to the item of the extension information being indexed by plural items in the point cloud file, wherein the first point cloud data is a portion of the point cloud file corresponding to the plural items; and
the extension information is used for providing support for an application of second point cloud data when the item of the extension information is not indexed by items in the point cloud file, wherein the second point cloud data is a portion of the point cloud file corresponding to the file level location of the item of the extension information.

6. The method according to claim 2, wherein the associating comprises:
generating a signaling message, wherein the signaling message comprises an identifier of the point cloud file and an identifier of the extension information.

7. The method according to claim 6, wherein the signaling message further comprises at least one of a service identifier of the service or an information type identifier of the extension information.

8. The method according to claim 6, wherein the extension information comprises the file level location of one or more items of the extension information or comprises identification of one or more items in the point cloud file that are associated with the extension information.

9. The method according to claim 6, wherein the transmitting comprises:
transmitting the signaling message to the receiving device, wherein the signaling message instructs the receiving device to pull the point cloud file and the extension information.

10. The method according to claim 1, wherein the extension information comprises application scenario information indicating whether the service implemented using the point cloud file is a high definition map application.

11. A point cloud file application method comprising:
receiving a point cloud file and associated extension information, the point cloud file and the associated extension information having been obtained by a transmitting device by obtaining the point cloud file and extension information corresponding to the point cloud file and then associating the point cloud file and the extension information, wherein the point cloud file comprises point cloud data, and the extension information providing information for a service comprising one of a navigation planning service or a high definition map service; and performing the service using the point cloud data based on the extension information, wherein a correspondence between an item of the associated extension information and an item in the point cloud file is indicated by (i) the item in the point cloud file indicating an index of the item of the associated extension information and (ii) when the item of the extension information is not indexed by any item in the point cloud file, the correspondence is indicated by a file level location of the item of the associated extension information.

12. The method according to claim 11, wherein, before the performing the service, the method further comprises:

decoding the point cloud file and the associated extension information.

13. The method according to claim 11, wherein the receiving comprises:

receiving an encapsulated point cloud file, wherein the associated extension information is encapsulated in the encapsulated point cloud file.

14. The method according to claim 13, wherein the item of the associated extension information is included in the encapsulated point cloud file.

15. The method according to claim 14, wherein the extension information is used for providing support for an application of first point cloud data in response to the item of the associated extension information being indexed by plural items in the point cloud file, wherein the first point cloud data is a portion of the point cloud file corresponding to the plural items; and the extension information is used for providing support for an application of second point cloud data when the item of the associated extension information is not indexed by items in the point cloud file, wherein the second point cloud data is a portion of the point cloud file corresponding to the file level location of the item of the associated extension information.

16. The method according to claim 11, wherein the receiving comprises:

receiving a signaling message, wherein the signaling message comprises an identifier of the point cloud file and an identifier of the associated extension information; and pulling the point cloud file and the associated extension information according to the signaling message.

17. The method according to claim 16, wherein the signaling message further comprises at least one of a service identifier of the service or an information type identifier of the associated extension information.

18. The method according to claim 16, wherein the associated extension information comprises the file level location of one or more items of the associated extension information or comprises identification of one or more items in the point cloud file that are associated with the extension information.

19. The method according to claim 11, wherein the associated extension information comprises application scenario information indicating whether the service implemented using the point cloud file is a high definition map application.

20. A point cloud file transmission apparatus, comprising:

processing circuitry configured to obtain a point cloud file and extension information corresponding to the point cloud file, the point cloud file comprising point cloud data, the extension information providing information for a service comprising one of a navigation planning service or a high definition map service using the point cloud data;

indicate a correspondence between an item of the extension information and an item in the point cloud file by (i) the item in the point cloud file indicating an index of the item of the extension information and (ii) when the item of the extension information is not indexed by any item in the point cloud file, the correspondence is indicated by a file level location of the item of the extension information;

associate the point cloud file with the extension information; and transmit the point cloud file and the extension information to a receiving device, so that the receiving device performs the service using the point cloud data based on the extension information.

* * * * *